(12) United States Patent
Bernhard

(10) Patent No.: US 7,043,992 B2
(45) Date of Patent: May 16, 2006

(54) PRESSURE INDICATOR

(75) Inventor: Ernst Bernhard, Aegerten (CH)

(73) Assignee: Gebr. Gloor AB, Burgdorf (CH)

( * ) Notice: Subject to any disclaimer, the term of this patent is extended or adjusted under 35 U.S.C. 154(b) by 66 days.

(21) Appl. No.: 10/488,737

(22) PCT Filed: Jul. 8, 2002

(86) PCT No.: PCT/CH02/00367

§ 371 (c)(1),
(2), (4) Date: Sep. 21, 2004

(87) PCT Pub. No.: WO03/023346

PCT Pub. Date: Mar. 20, 2003

(65) Prior Publication Data

US 2005/0016284 A1 Jan. 27, 2005

(30) Foreign Application Priority Data

Sep. 7, 2001 (CH) .................... 1664/01

(51) Int. Cl.
*G01L 9/00* (2006.01)
(52) U.S. Cl. ........................................ 73/705
(58) Field of Classification Search ................ 73/700, 73/705, 733
See application file for complete search history.

(56) References Cited

U.S. PATENT DOCUMENTS

| 3,592,218 A | 7/1971 | Guy |
| 4,147,431 A * | 4/1979 | Mann ........................ 356/72 |
| 5,014,786 A | 5/1991 | Kobayashi |
| 5,027,740 A | 7/1991 | Kramer et al. |
| 5,189,979 A | 3/1993 | Popenoe |
| 5,213,057 A | 5/1993 | Müeller |
| 5,339,764 A | 8/1994 | Singbartl |
| 5,877,426 A * | 3/1999 | Hay et al. ................. 73/733 |
| 6,626,043 B1 * | 9/2003 | Bailey et al. ............... 73/705 |
| 6,877,378 B1 * | 4/2005 | Bailey et al. ............... 73/705 |

* cited by examiner

*Primary Examiner*—Edward Lefkowitz
*Assistant Examiner*—Andre Allen
(74) *Attorney, Agent, or Firm*—The Webb Law Firm

(57) ABSTRACT

A pressure indicator comprising a piston which is displaceably mounted in a housing counter to the pressure of a spring on an axis and which can be impinged upon with pressure which is to be measured; also comprising optical display means actively cooperating with the piston. According to the invention, the structure of the indicator is simplified, compact and robust. This is achieved in that the optical display means comprise a front glass arranged perpendicular to the axis and one or several display elements which can be moved by the piston relative to said front glass and which respectively alternate at various pressures between a first position wherein they are optically visible from outside through the front glass and a second position wherein they are not optically visible from outside through the front glass.

20 Claims, 3 Drawing Sheets

PRESSURE INDICATOR

FIELD OF THE INVENTION

The present invention relates to the field of the indication of pressures which prevail in a volume filled with a medium, in particular, a gas.

DESCRIPTION OF THE RELATED ART

Conventional pressure indicator devices (manometers) indicate the current pressure in a volume filled with a medium, in particular gas, usually on a dial by means of a pointer rotatable about an axis of rotation. The pressure is converted into a small rotational movement by means of a tube spring, capsule spring, plate spring or the like. However, manometers are also known. (JP-A2-04145335), in which, by means of the pressure, a piston arranged in a cylinder is displaced counter to the force of a spring and the displacement travel is converted into a pointer rotation about the axis of displacement. Other manometers such as are used, for example, for indicating tire pressures on a tire valve, indicate the displacement travel of the piston directly on a scale extending in the direction of displacement (see, for example, U.S. Pat. No. 3,592,218).

In most manometers, a small movement caused by the pressure is stepped up mechanically, in order to obtain a clearly visible pointer deflection. Pressure surges, mechanical vibrations or even knocks may damage such instruments. If they are seriously damaged or even broken away, a hole appears which results in the emergence of the fluid or gas. The construction size does not allow such instruments to be used at all in instances where only a little space is available. On the other hand, comparatively high read-off accuracy is possible as a result of the large dial. In the direct indicators according to U.S. Pat. No. 3,592,218, there is no step-up.

SUMMARY OF THE INVENTION

The object of the invention is to provide a pressure indicator device which allows an easily read-off optical indication of the pressure by the simplest possible mechanical means, is extremely robust in mechanical terms, has a highly compact construction and can easily be mounted on a vessel which is under pressure.

The essence of the invention is that the optical indicator means comprise a front glass arranged transversely to the axis and indicator elements which are movable in relation to the front glass by means of the piston and which in each case change in the event of different pressures between a first position, in which they are optically visible from outside through the front glass, and a second position, in which they are optically not visible from outside through the front glass.

A first preferred embodiment of the pressure indicator device according to the invention is characterized in that the optical indicator means comprise a plunger displaceable toward the underside, acting as a contact face, of a front glass by means of the piston, the front glass and plunger being designed in such a way that they are at a different distance from one another at different locations in a plane perpendicular to the axis. As a result, when the piston is displaced, an optically active contact between plunger and front glass is made at different locations, depending on the piston position, and causes the contact points to become visible through the, for example, matt front glass. If the contact points are in the form of characters, in particular digits or numerals, then, depending on the pressure on the piston, different characters (for example, bars or the like arranged in a radiating manner on a circular ring) thus become visible in succession.

A preferred development of this embodiment is distinguished in that the front glass has a plane contact face, and that raised characters of different height are formed on that surface of the plunger which is located opposite the contact face. The advantage of this is that a simple plane glass pane can be used as the front glass. Preferably, in this case, the plunger consists of an elastomeric material, in particular rubber.

It is also conceivable, however, that the plunger consists of a hard inelastic material, in particular of a plastic or a metal, and in that the interspace between the plunger and the front glass is filled with a displaceable contrast medium.

Another preferred development is distinguished in that that surface of the plunger which is located opposite the contact face is plain, and that raised characters of different heights are formed in the contact face of the front glass.

A second preferred embodiment of the pressure indicator device according to the invention is characterized in that the optical indicator means comprise a pointer spring engaged with the piston and having a plurality of pointers, in that the pointer spring is designed in such a way that, during the pressure-induced displacement of the piston in the axial direction and during the associated bending of the pointer spring, the pointers move transversely to the axis, in particular in the radial direction, and in that, on the front glass, optical masking means are provided, through which the pointers are visible or not visible through the front glass from outside, depending on the pressure.

In particular, the pointer spring is of disk-shaped design, the pointer spring being supported with its outer margin on a stop spring arranged above it and fastened to the housing and being acted upon in the central region by the piston, and the pointers extending upward in the axial direction, being bent transversely to the axial direction at the upper end and having pointer heads of different lengths in the bent region, and the masking means comprising a circular printed face which is arranged on the underside of the front glass and which optically masks the pointer heads when the pressure indicator device is in the pressureless state.

The pressure indicator device according to the invention can be used in a particularly versatile and simple way when it has the external configuration of a screw with a head part and with a threaded part, and when the optical indicator means are arranged in the head part and the piston is arranged in the threaded part.

In such a compact pressure indicator device, safety and capability during use under rough conditions can be further increased when a predetermined breaking point is provided between the head part and the threaded part in the housing, when the piston is sealed off below the predetermined breaking point by means of a seal, and when a pressure plate for distributing the piston pressure is arranged between the upper end of the piston and the plunger or the pointer spring.

Further embodiments may be gathered from the dependent claims.

DESCRIPTION OF THE DRAWINGS

The invention will be explained in more detail below with reference to exemplary embodiments, in conjunction with the drawing in which.

DESCRIPTION OF THE PREFERRED EMBODIMENTS

Figure 1:
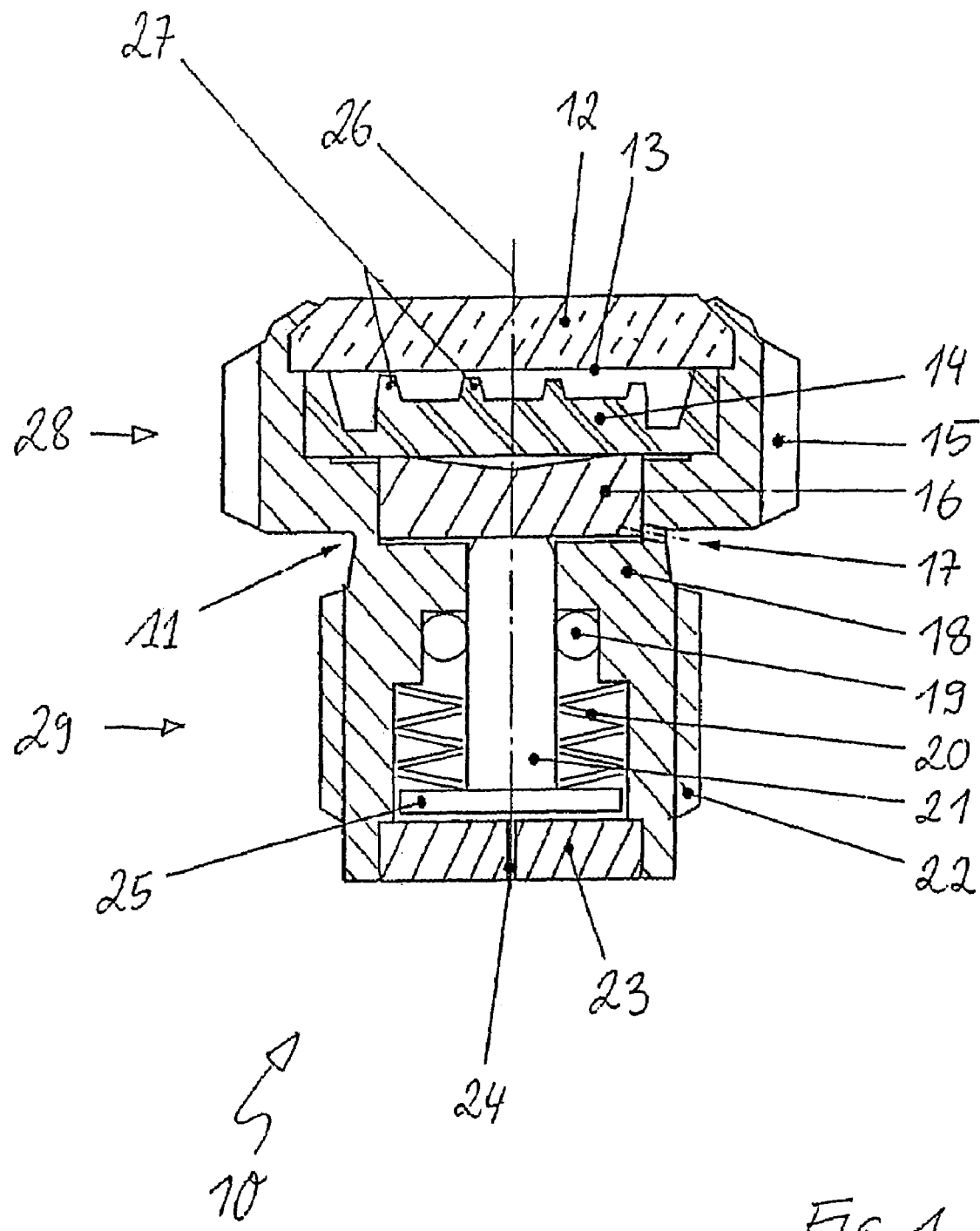
FIG. 1 shows a longitudinal section through a first preferred exemplary embodiment of a pressure indicator device according to the invention with an elastomeric plunger.

The first exemplary embodiment, illustrated in FIG. 1, shows a pressure indicator device (pressure indicator) 10 which comprises a one-piece housing (monobloc) 18.

The housing 18 has the external form of a screw with a screw axis 26 and with a head part (screw head) 28 and a threaded part 29. The housing 18 has in the head part 28 corresponding key faces 15 on the outer circumference. In the low region of the housing 18, the threaded part 29, a screw-in thread 22 is arranged coaxially to the axis 26, by means of which screw-in thread the pressure indicator device 10 can be screwed preferably into a cock attached to a compressed gas bottle. A piston 21 with a head plate 25 is guided in the direction of the axis 26 within the housing portion provided with the screw-in thread 22. The head plate 25 faces the pressure side. A spring 20, which is supported at the lower end on the head plate 25 and at the upper end on the housing 18, acts counter to the piston 21, which is under pressure, and determines the axial travel of the latter.

In order to prevent an emergence of gas between the piston 21 and housing 18, an annular seal 19, preferably in the form of an O-ring, is installed. The end of the screw-in part of the housing 18 receives a solid cover 23 with a small damping bore 24 which limits the gas throughflow. This form of construction prevents the situation where gas may emerge if the upper part of the pressure indicator 10, which corresponds to the screw head, is damaged or even broken away. A predetermined breaking point 11 in the middle region of the housing 18 between the head part 28 and the threaded part 29 is intended, if the bottle falls down or the like, to make it easier for a break to occur at the correct point, without the threaded part having the screw-in thread 22 being torn out of the corresponding threaded bore of the cock. The piston 21 terminates level with the predetermined breaking point 11 and is therefore not put at risk in the event that the housing 18 breaks away at the predetermined breaking point 11.

Located in the upper portion of the pressure indicator 10 is a pressure plate 16 which is acted upon by the piston 21 and which presses a plunger 14, arranged above it, toward the underside, acting as a contact face 13, of a matt front glass 12 which closes off the housing 18 upwardly. The plunger 14 consisting of an elastically deformable material, for example rubber, is fixed at a margin between the front glass 12 and the housing 18 and in the inner region carries arranged so as to be distributed on the top side, characters 27 formed with different heights. The matt front glass 12 prevents the characters (digits, letters or the like) of unequal height from being directly visible from above when the pressure indicator 10 is viewed on top. If, then, the piston 21 is pressed upward (outward) by the gas pressure, the pressure plate 16 is pushed, together with the plunger 14, toward the matt side of the front glass 12. Due to the contact of the preferably dark-colored rubber or rubber-like plunger with the bright matt surface of the front glass 12, the highest of the characters 27 is the first to become visible from outside.

The height gradations of the characters 27 on the plunger 14 correspond to the stroke which the piston 21 executes in the event of increasing pressure. When the compressed gas bottle is full, all the characters 27 are pressed against the matt front glass 12. The characters are "extinguished" in series in the event of falling pressure, in a similar way to an LCD (Liquid Crystal Display) indicator.

For practical reasons, the indicator, that is to say the arrangement of the characters 27 on the top side of the plunger 14, is configured in such a way that it does not appear in any position after being tightened firmly when being mounted on the head. In another embodiment (not illustrated in FIG. 1), instead of the plunger 14 with the raised characters 27, a flat plunger is installed. In the pressureless state, the plunger, remains back from the front glass and does not make any contact. In this embodiment, the front glass, injection-molded from plastic, carries the characters projecting inward. There is the possibility, here, of lettering on the inside of the front glass. The remaining functioning is identical to that of the first embodiment.

A further embodiment is distinguished in that the space between the smooth front glass 12 and the plunger 14 is filled with a contrast medium. The plunger 14 or a comparable indicator means therefore no longer has to be soft and elastic. They can be manufactured from harder plastic or from metal. In the pressureless state, the plunger 14 is not visible on account of the contrast medium. When it is pressed against the front glass 12 by the pressure in the bottle, the interposed contrast medium is displaced, and the contour of the character 27 on the plunger 14 becomes visible.

In this respect, however, even an indication which is as it were continuous is possible: If, for example, an elastomeric plunger 14 is used, which does not carry any special characters 27, but is designed upwardly in conical form or in the form of a spherical cap, the plunger is pressed to a greater or lesser extent onto the matt front glass 12, depending on the pressure, and is thus compressed. The indication which appears is a filled-out circle with a greater or lesser diameter, the diameter changing continuously with the pressure. It goes without saying that, in this refinement, scale circles corresponding to a specific pressure value may be formed on the front glass 12.

Figure 2:
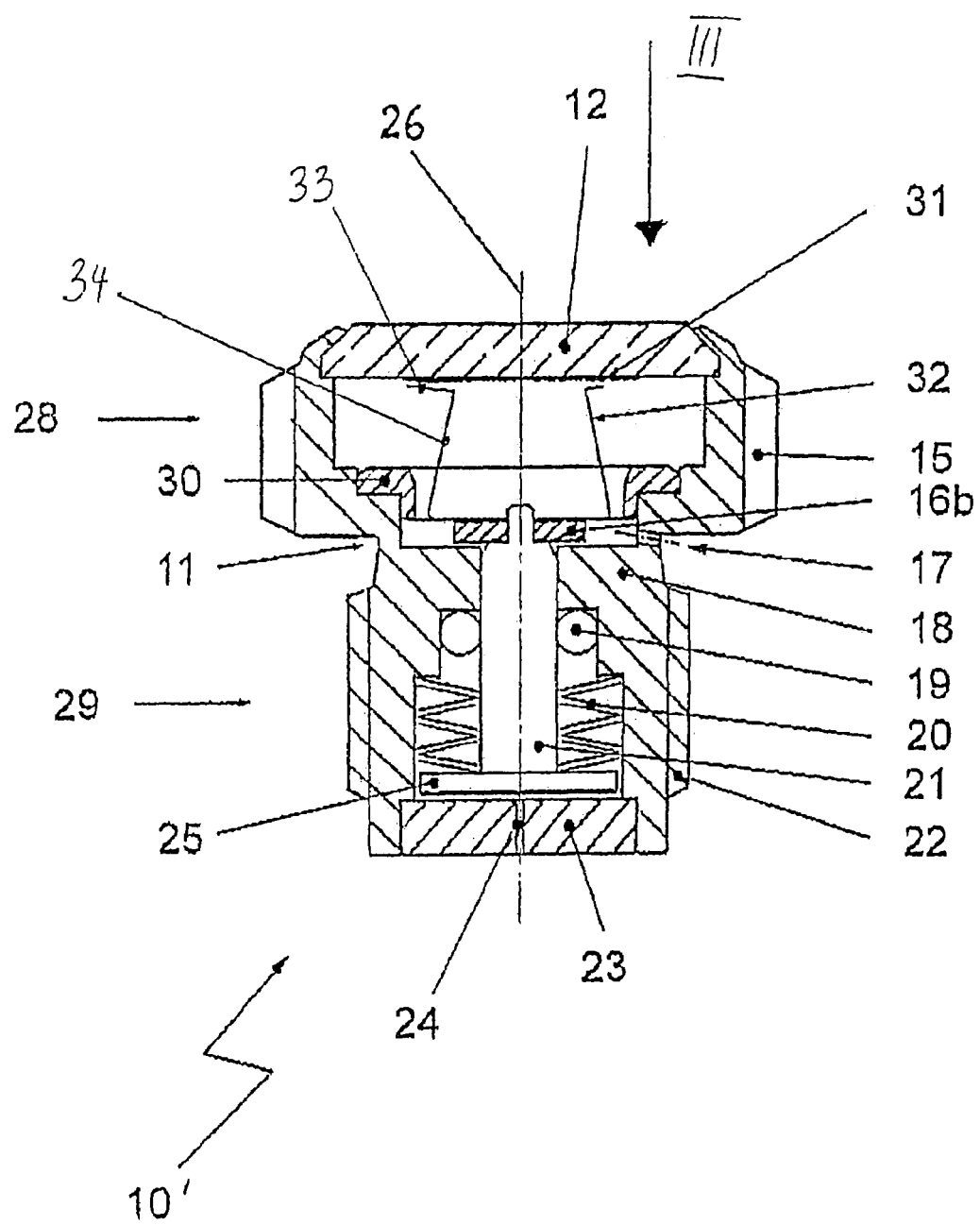
FIG. 2. shows a longitudinal section through a second preferred exemplary embodiment of a pressure indicators device according to the invention: with a pointer spring.
Figure 3:
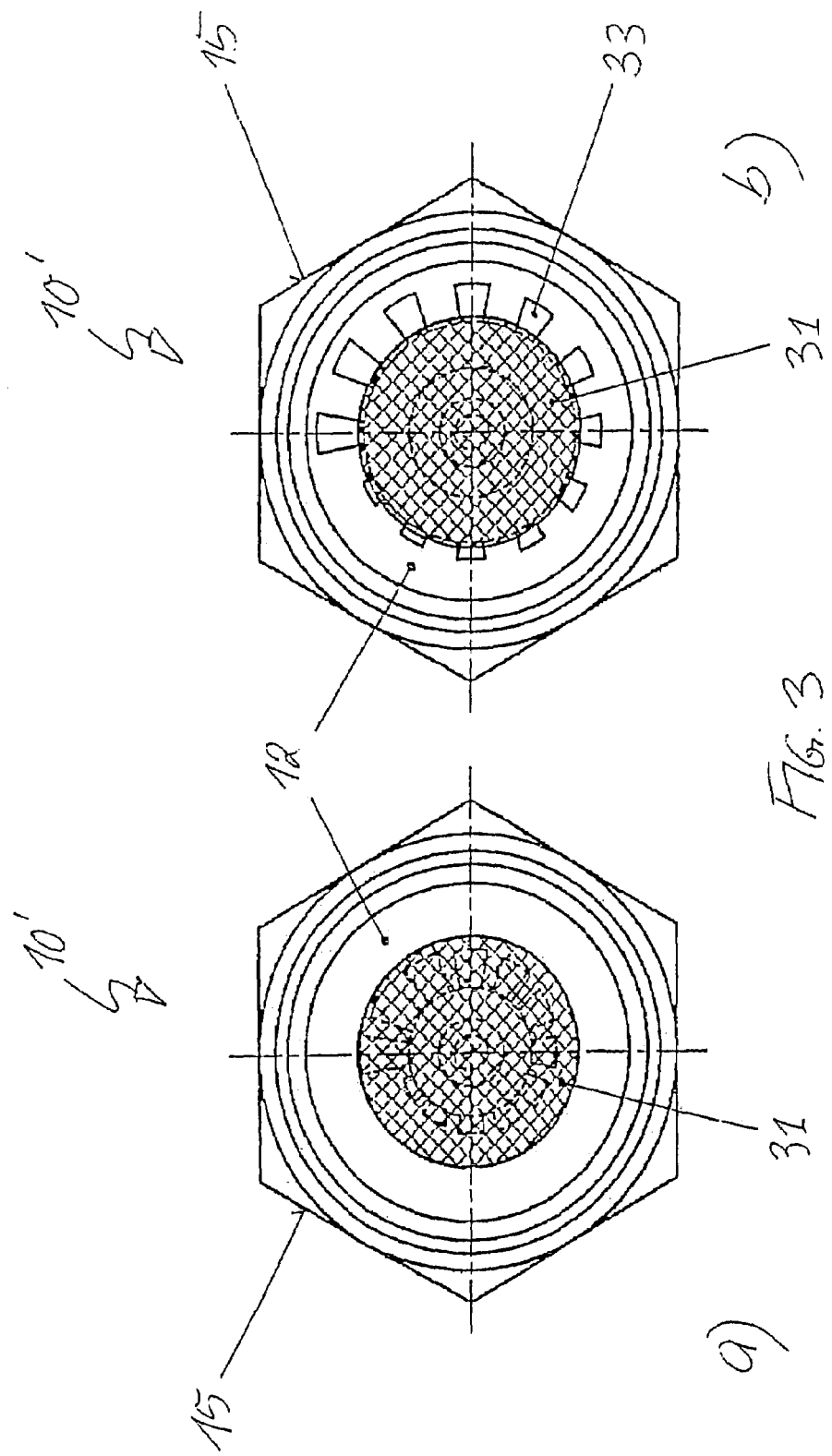
FIG. 3 shows a top plan view of the exemplary embodiment from FIG. 2 in the case of low or absent pressure (FIG. 3a; pointer heads are masked) and in the case of high pressure (FIG. 3b; pointer heads emerge from behind the mask).

FIG. 2 illustrates in longitudinal section a second preferred exemplary embodiment of the invention. The pressure indicator device 10' of. FIG. 2 is identical in most parts to the example of FIG. 1, and therefore the same reference symbols are used for these parts. Instead of the plunger 14 from FIG. 1, a special pointer spring 32 is installed here. The (disk-shaped) pointer spring 32 sits on a pressure plate 16b and engages with its outer margin behind a stop ring 30 fastened to the housing 18. Said pointer spring carries, on its circumference, a number of pointers 34 which extend upward and are bent at the upper end and which have pointer heads 33 of unequal length which have a high contrast with respect to an (opaque) printed face 31 on the underside of the front glass 12. In a state free of pressure, the pointer spring 32 is in the position of rest. All the pointer heads 33 are located behind the round printed face 31 on the front glass, that is to say are masked by this face and are therefore not visible (FIG. 3a).

When the bottle is full, the pressure plate 16b is pressed forward (upward) to the greatest possible extent. As a result, the pointer spring 32 bends in the region between the pressure plate 16b and the stop ring 30. The result of this is that all the pointers 34 and consequently all the pointer heads 33 move outward and, according to their length, emerge successively behind the printed face 31 and thereby become visible (FIG. 3b). If the pressure in the bottle falls, the pressure plate 16b moves away from the front glass 12. The bent region between the pressure plate 16b and the stop ring 30 can thereby bend back a little. The result of this is that the pointer 34 with the shortest pointer head 33 is the first to disappear under the printed face 31 of the front glass 12. The number of remaining pointer heads gives information as to the filling state of the bottle. In the printing of the front glass 12, a labeling can be inserted in a simple way, which can give further information as to the gas in the bottle.

Manufacturer's imprints may also be made. In a pressure indicator of this construction type, it is possible to ensure an even finer subdivision of the indicator. Moreover, maximum indication contrast is possible. The example according to FIG. 2 is therefore distinguished by the following features:

The correct design of the pointer spring 32 achieves a step-up which results in a large deflection of the pointer head 33, without further parts being necessary.

A change in the step-up, is achieved in a simple way by the diameter of the pressure plate 16b being varied.

Overall, in instances where no particular accuracy is demanded, the invention affords a novel and particularly advantageous possibility for pressure indication: the pressure indicator according to the invention is in the manner of a screw. It consequently becomes possible to indicate the pressure of a gas bottle constantly. The pressure indicator is screwed directly into an additional bore laterally on the cock. The hard-wearing capacity of the indicator far exceeds all manometers known hitherto, even that of the cock into which it is screwed. Even the failure or breaking away of the above mentioned part does not cause any accident or any leak. At the same time, the size is dimensioned (with a length of, for example, 20 mm and with a maximum diameter of, for example, 19.5 mm, this corresponding to a screw head with the key width of 17 mm) such that a protective cap, which, according to regulations, protects the cock, can continue to be used. In bottles with valves which do not have to be protected by protective caps for transport purposes, an even greater advantage is afforded in that the pressure in the bottle is visible at a glance without manipulations. Logistical problems are consequently solved. The construction is very simple, so that, while the high degree of safety remains unchanged, costs can be saved.

Since no step-up or other awkward parts are required, the pressure indicator 10 according to the invention is very hard-wearing. The installation of the piston 21 with a head plate 25 prevents a damaged or broken-away upper part from causing leaks and accidents. The use of a plunger 14 with "lettering" of unequal height or of a pointer spring 32 with pointer heads 33 of different lengths leads to a very simple monobloc housing (18) which at both ends receives a "cover" (cover 23 and front glass 12) which is rolled in or crimped in. For protection in the event of a leak of the seal 19, the pressure indicator is provided with a pressure equalizing or safety bore 17. The front glass 12 is thus protected from excess pressure.

LIST OF REFERENCE SYMBOLS 10, 10' Pressure indicator device (pressure indicator)
11 Predetermined breaking point
12 Front glass
13 Contact face
14 Plunger
15 Key face
16, 16b Pressure plate
17 Pressure equalizing bore
18 Housing (one-piece)
19 Seal
20 Spring
21 Piston
22 Screw-in thread
23 Cover
24 Damping bore
25 Head plate
26 Axis
27 Character (digits, letters, etc.)
28 Head part
29 Threaded part
30 Stop ring
31 Printed face
32 Pointer spring
33 Pointer head
34 Pointer

The invention claimed is:

1. A pressure indicator device compnsing a piston, mounted displaceably in a housing along an axis counter to a pressure of a spring and configured to be acted upon by a pressure to be measured, and optical indicator means operatively connected to the piston, wherein the optical indicator means comprise a front glass arranged transversely to the axis and one or more indicator elements are movable in relation to the front glass by means of the piston, and wherein the indicator elements move between a first position and a second position in the event of different pressures, wherein the indicator elements are optically visible from outside through the front glass when they are in the first position, and wherein the indicator elements are optically not visible from outside through the front glass when they are in the second position.

2. The pressure indicator device as claimed in claim 1, wherein the optical indicator means comprise a plunger displaceable toward the underside, acting as a contact face, of a front glass by means of the piston, the front glass and plunger configured so that they are at a different distance from one another at different locations in a plane perpendicular to the axis.

3. The pressure indicator device as claimed in claim 2, wherein the front glass has a plain contact face, and wherein raised characters of different heights are formed as indicator elements on that surface of the plunger which is located opposite the contact face.

4. The pressure indicator device as claimed in claim 3, wherein the plunger consists of an elastomeric material.

5. The pressure indicator device as claimed in claim 3, wherein the plunger consists of a hard inelastic material, and wherein an interspace between the plunger and the front glass is filled with a displaceable contrast medium.

6. The pressure indicator device as claimed in claim 2, wherein the surface of the plunger which is located opposite the contact face is plain, and wherein raised characters of different heights are formed in the contact face of the front glass.

7. The pressure indicator device as claimed in claim 1, wherein the optical indicator means comprise a pointer spring engaged with the piston and having a plurality of pointers, wherein the pointer spring is configured so that when, during the pressure-induced displacement of the piston in an axial direction and during an associated bending of the pointer spring, the pointers move transversely to the axis in a radial direction, and wherein optical masking means are provided on the front glass through which the pointers are one of visible and not visible through the front glass from outside, depending on the pressure.

8. The pressure indicator device as claimed in claim 7, wherein the pointer spring is of disk-shaped design, wherein the pointer spring is supported with its outer margin on a stop ring arranged above it and fastened to the housing and is acted upon in a central region by the piston, wherein the pointers extend upward in the axial direction, are bent transversely to the axial direction at the upper end and have pointer heads of different lengths in the bent region, and wherein the masking means comprise a circular printed face, wherein the masking means is arranged on the underside of the front glass, and wherein the masking means optically mask the pointer heads when the pressure indicator device is in a pressureless state.

9. The pressure indicator device as claimed in claim 1, wherein the pressure indicator device includes a screw with a head part and a threaded part, and wherein the optical indicator means are arranged in the head part and the piston is arranged in the threaded part.

10. The pressure indicator device as claimed in claim 9, wherein a predetermined breaking point is provided between the head part and the threaded part in the housing, wherein the piston is sealed off below the predetermined breaking point by a seal, and wherein a pressure plate for distributing the piston pressure is arranged between the upper end of the piston and one of the plunger and the pointer spring.

11. The pressure indicator device as claimed in claim 1, wherein the housing is in one piece and is closed off in the head part outwardly by the front glass, and wherein a pressure equalizing bore leads outward between the front glass and the threaded part in the housing.

12. The pressure indicator device as claimed in claim 1, wherein the housing is in one piece and is closed off in the threaded part outwardly by a cover, and wherein a damping bore leading outward is provided in the cover.

13. The pressure indicator device as claimed in claim 11, wherein the front glass and the cover are one of rolled and crimped into the housing.

14. The pressure indicator device as claimed in claim 2, wherein the pressure indicator device includes a screw with a head part and a threaded part, and wherein the optical indicator means are arranged in the head part and the piston is arranged in the threaded part.

15. The pressure indicator device as claimed in claim 7, wherein the pressure indicator device includes a screw with a head part and a threaded part, and wherein the optical indicator means are arranged in the head part and the piston is arranged in the threaded part.

16. The pressure indicator device as claimed in claim 2, wherein the housing is in one piece and is closed off in the head part outwardly by the front glass, and wherein a pressure equalizing bore leads outward between the front glass and the threaded part in the housing.

17. The pressure indicator device as claimed in claim 7, wherein the housing is in one piece and is closed off in the head part outwardly by the front glass, and wherein a pressure equalizing bore leads outward between the front glass and the threaded part in the housing.

18. The pressure indicator device as claimed in claim 2, wherein the housing is in one piece and is closed off in the threaded part outwardly by a cover, and wherein a damping bore leading outward is provided in the cover.

19. The pressure indicator device as claimed in claim 7, wherein the housing is in one piece and is closed off in the threaded part outwardly by a cover, and wherein a damping bore leading outward is provided in the cover.

20. The pressure indicator device as claimed in claim 12, wherein the front glass and the cover are one of rolled and crimped into the housing.

* * * * *

UNITED STATES PATENT AND TRADEMARK OFFICE
CERTIFICATE OF CORRECTION

PATENT NO. : 7,043,992 B2
APPLICATION NO. : 10/488737
DATED : May 16, 2006
INVENTOR(S) : Ernst Bernhard It is certified that error appears in the above-identified patent and that said Letters Patent is hereby corrected as shown below:

Column 6, Line 21, Claim 1, "compnsing a piston" should read -- comprising a piston --

Signed and Sealed this

Twelfth Day of September, 2006

JON W. DUDAS
*Director of the United States Patent and Trademark Office*